United States Patent [19]

Hagimori et al.

[11] Patent Number: 5,348,724
[45] Date of Patent: Sep. 20, 1994

[54] METHOD OF DECOMPOSING HYDROGEN PEROXIDE

[75] Inventors: Kenji Hagimori, Kawaguchi; Yuzuru Abe, Hanyu; Tetsuo Kanke, Misato, all of Japan

[73] Assignee: Toshin Chemical Industry Co., Ltd., Tokyo, Japan

[21] Appl. No.: 64,962

[22] Filed: May 18, 1993

[30] Foreign Application Priority Data

Jun. 11, 1992 [JP] Japan .................................. 4-177347

[51] Int. Cl.$^5$ ........................ C01B 17/90; C02F 1/68
[52] U.S. Cl. .................................. 423/531; 210/763; 210/928; 423/579
[58] Field of Search ................ 210/928, 763; 423/531, 423/579

[56] References Cited

U.S. PATENT DOCUMENTS

| | | | |
|---|---|---|---|
| 3,787,563 | 1/1974 | Kartte et al. | 423/531 |
| 4,376,108 | 3/1983 | Lowiciki et al. | 423/531 |
| 4,601,884 | 7/1986 | Coeckelberghs et al. | 423/579 |
| 4,663,043 | 5/1987 | Molin et al. | 210/928 |
| 4,696,749 | 9/1987 | Habermann et al. | 210/763 |
| 5,026,535 | 6/1991 | Jonsson et al. | 423/531 |

FOREIGN PATENT DOCUMENTS

| | | | |
|---|---|---|---|
| 1305934 | 11/1961 | France | 423/531 |
| 15349 | 5/1976 | Japan | 210/763 |
| 57-83287 | 5/1982 | Japan . | |
| 247604 | 4/1986 | Japan . | |
| 61-186208 | 8/1986 | Japan . | |
| 1712304 | 2/1992 | U.S.S.R. | 423/531 |

*Primary Examiner*—Wayne Langel
*Attorney, Agent, or Firm*—Frishauf, Holtz, Goodman & Woodward

[57] ABSTRACT

The improved method achieves effective and economical decomposition of hydrogen peroxide and may be used in recycling hydrogen peroxide containing spent sulfuric acid that has been used in wafer cleaning and other operations in the process of semiconductor fabrication or in removing residual hydrogen peroxide that will occur either within the papermaking process or in plant effluents as a consequence of a shift from chlorine-containing bleaching agents to oxygen-containing bleaching agents.

When coke was added in an amount of 10 wt % to a solution of 0.88 wt % hydrogen peroxide in 72.8 wt % sulfuric acid, followed by treatment at 60°–70° C. for 4 hours, the concentration of hydrogen peroxide dropped to 0.0001 wt % and below. When coke was added in an amount of 10 wt% to each of a solution (pH, 0.94) of 1.0 wt % hydrogen peroxide in 1.1 wt % sulfuric acid and a solution (pH, 2.58) of 1.04 wt % hydrogen peroxide in sulfuric acid followed by treatment at 60°–70° C. for 4 hours, the concentration of hydrogen peroxide dropped to 0.0001 wt % or below and 0.10 wt %, respectively.

5 Claims, No Drawings

METHOD OF DECOMPOSING HYDROGEN PEROXIDE

BACKGROUND OF THE INVENTION

This invention relates to a method of decomposing hydrogen peroxide in aqueous solution, more particularly, to a method that is capable of effective and economical decomposition of hydrogen peroxide in waste acids or wastewaters.

Hydrogen peroxide is a strong oxidizer and used in various applications including disinfection and deodorizing of containers of medicines or vessels or tools in the fermentation industry, purification of fats and oils, bleaching of textile fibers, bleaching and sterilization of processed marine products, as well as the manufacture of drugs. Hydrogen peroxide is also used in rocket fuels either independently or in admixture with kerosine or the like.

The use of hydrogen peroxide has recently expanded to the electronics industry, where it is added to sulfuric acid and used for cleaning silicon substrates end other operations in the process of IC and LSI fabrication. Further, the spread of waste paper recycling activities contributed to the recent expansion of the demand of hydrogen peroxide as deinking and bleaching agent or for use in the treatment of plant effluents, as evidenced by the two-digit annual increase of its use in the three to four years that preceded 1990.

Among the various uses of hydrogen peroxide listed above, its use in processed marine products is regulated by the Food Sanitation Act and belated notifications, which require that hydrogen peroxide be decomposed or removed before the final food is produced. As a result of this treatment for removal, hydrogen peroxide can evolve and remain in the wastewater but there are no particular regulations concerning the removal of such residual hydrogen peroxide. However, irrespective of variation in the uses of hydrogen peroxide, the residual hydrogen peroxide will eventually get into the wastewater or other liquid wastes and it must be decomposed completely before those wastes are discharged. Unfortunately, except for catalytic decomposition using metals such as platinum and palladium or oxides of metals such as manganese, cobalt, copper and silver, there are no existing methods that are effective and appropriate for decomposing the residual hydrogen peroxide. Particularly, there are no methods that ensure satisfactory results in the process of decomposing a small or tiny amount of the residual hydrogen peroxide. To confirm this point, the present inventors searched through patent specifications that were prepublished (laid open to public inspection) in the past ten-odd years and found the following patents that are apparently relevant and worth review: Japanese Patent Public Disclosure No. 186208/1986, "Method of decomposing hydrogen peroxide", filed by Shoko Tsusho K.K., and Japanese Patent Public Disclosure No.83287/1982, "Method of eliminating hydrogen peroxide", filed by Kyowa Hakko Kogyo Co., Ltd.

However, the method of the first patent is an improved catalytic method and judging from the examples, it would be difficult to decompose hydrogen peroxide completely (to the 1 ppm level). In addition, handling hydrogen gas is not only cumbersome but also dangerous in practice. Furthermore, the patent states explicitly that the catalysts it uses suffer from the problem of decrease in activity.

The second patent, Japanese Patent Public Disclosure No.83287/1982, provides an alternative to catalase for use in analytic methods and it states that the objective of the claimed invention is to accomplish quantitative determination of a sample. Considering the possibility that the catalase substitute may remain in solution after decomposition, the method of the second patent will find only limited use.

Papermaking mills currently use chlorine containing compounds such as sodium hypochlorite to bleach pulp. However, it has recently been pointed out that toxic dioxins can occur during the incineration of wastes and a shift to oxygen-containing bleaching agents such as hydrogen peroxide and ozone is under review.

The use of hydrogen peroxide as a bleaching agent involves one serious problem; that is, residual hydrogen peroxide will eventually get into the wastewater but there is no effective and economical method that can be used to decompose such residual hydrogen peroxide in the wastewater. The method described in Japanese Patent Public Disclosure No.186208/1986, supra, is intended to prevent the drop in catalyst activity and in order to enhance the percent decomposition of hydrogen peroxide in wastewaters, hydrogen gas must be supplied to the catalyst in column in a considerably larger amount than the wastewater to be passed through the column.

As already mentioned, sulfuric acid supplemented with hydrogen peroxide is used for cleaning silicon wafers and for other purposes in the process of IC and LSI fabrication. The problem with this practice is that it gives rise to a waste acid containing hydrogen peroxide; this waste acid is difficult to handle because if it is simply discharged into rivers and other water bodies after neutralization, it can cause the problem of pollution with hydrogen peroxide.

It has been proposed that the sulfuric acid content of the waste acid be recycled for effective use as a substitute neutralizer for pH adjustment in the treatment of wastewaters. However, this approach also involves difficulty due to the presence of harmful hydrogen peroxide in wastewaters. Substitution for the sulfuric acid that is used in the manufacture of chemicals is also difficult to implement since it involves rapid decomposition of hydrogen peroxide or unwanted side reactions such as oxidation.

SUMMARY OF THE INVENTION

The present invention has been accomplished under these circumstances and has as an object providing an effective and economical method by which the hydrogen peroxide containing spent sulfuric acid that has been used in wafer cleaning and other operations in the process of semiconductor fabrication can be recycled by eliminating hydrogen peroxide from such spent sulfuric acid and using it for pH adjustment in the treatment of wastewaters or by using it as a raw material for the manufacture of aluminum sulfate which is used as a flocculant in the treatment of water, or by which the residual hydrogen peroxide in a wastewater that occurs within the papermaking process or in any other plants can be fully removed, which removal is mandatory if there is to be a shift from chlorine-containing bleaching agents to oxygen-containing bleaching agents in the papermaking industry.

The present inventors conducted intensive studies with a view to attaining the above-stated object of the invention. As a result, they found the following: the concentration of hydrogen peroxide in waste acids or wastewaters can be reduced by contacting them with a porous carbonaceous material such as coke at a predetermined elevated temperature; if a particular temperature is selected and, furthermore, if selection is optionally made as regards the pH condition, hydrogen peroxide can be removed almost completely irrespective of its initial concentration in the waste acid or wastewater to be treated; in addition, unlike the conventional method which decomposes hydrogen peroxide through contact with a catalyst, the new method is free from the problem of drop in catalyst activity that inevitably occurs in the course of time and it has no need to perform a special treatment for restoring the deactivated catalyst and, hence, it offers great economic benefits.

DETAILED DESCRIPTION OF THE INVENTION

The expression "enhanced temperature" as used herein means a temperature that cannot ordinarily be reached by mere variations in the natural conditions due to an increase in atmospheric temperature or other factors; specifically, the "enhanced temperature" is 40° C. and above, preferably 50° C. and above, more preferably 60° C. and above. The selection of suitable pH condition is optional but it becomes necessary depending on the case since the effect of pH differs greatly with the type of carbonaceous material to be used. The effect is great in the case of using coke and unless an acidic solution having a pH of 2.6 and below is prepared, satisfactory removal of hydrogen peroxide cannot be achieved even if the temperature is 60° C. and above. On the other hand, the effect of pH is comparatively small in the case of using activated carbon.

The effect of temperature is great irrespective of the type of carbonaceous material used and no carbonaceous material will perform satisfactorily as a decomposing catalyst unless the temperature is "elevated". How much should the temperature be elevated can be determined from a preliminary test by taking into account various factors comprehensively including the type of carbonaceous material used, the effect of pH and the permissible value of the concentration of residual hydrogen peroxide. Particularly for the case of using coke, the present inventors confirmed that satisfactory results were obtained when an acidic solution having a pH of 2.6 and below was prepared and used at a temperature of 40° C. and above, preferably at 50° C. and above, more preferably at 60° C. and above.

It may well be said that the present invention, in the broadest range of its scope, relates to a method by which hydrogen peroxide in an aqueous solution can be reductively and catalytically decomposed in a simple and effective manner through contact with a porous carbonaceous material at an elevated temperature.

The porous carbonaceous material may be exemplified by coke, charcoal, bone black, activated carbon and the like. Using coke as a porous carbonaceous material is economically the most preferred; if coke is used and the solution is adjusted to a pH of 2.6 and below and if contact with the coke is conducted at a temperature of 60° C. and above, the concentration of residual hydrogen peroxide can, in almost all cases, be reduced to 0.0001 wt % and less, namely, 1 ppm and less. There is no severe limitation to the size of carbonaceous material that can be used in the method of the present invention. So long as it is coarse enough to permit free passage of waste acids or wastewaters through the bed or layer thereof, it can be used in any dimensions.

Columns packed with coke are generally used in the practice of the present invention. For this purpose, small lumps of coke having an average size of from 3 mm to 60 mm, preferably from 10 mm to 20 mm can be used advantageously. This is because coke is usually available in these sizes and such coke is easy to handle. However, the co-presence of finnet coke particles or coke powder will cause no serious problem. They will eventually disappear, after greatly contributing to the reductive decomposition of hydrogen peroxide.

According to the method of the present invention, a waste acid or wastewater that contains hydrogen peroxide is placed under a predetermined temperature condition and, if necessary, under a predetermined pH condition and the waste acid or wastewater is then brought into contact with a porous carbonaceous material such as coke so that the hydrogen peroxide is reductively decomposed by the carbon content of the porous carbonaceous material, with the decomposition product being removed as carbon dioxide gas. On the other hand, as will be described specifically in the examples that follow, at least half of the residual hydrogen peroxide in the waste acid or wastewater becomes labile upon contact with the porous carbonaceous material, whereby it is decomposed into water and oxygen gas. The oxygen gas will readily evaporate to go outside the solution system.

Thus, in the method of the present invention, the decomposition of hydrogen peroxide will proceed efficiently via two reactions, one being the reductive decomposition by the carbon content and the other being the catalytic decomposition by contact with the porous carbonaceous material. This offers the following economic advantages: the carbonaceous material will be consumed in accordance with the amount of residual hydrogen peroxide but the quantity of its consumption is comparatively small; in addition, there is no need to adopt a special means of restoring the catalyst activity as in the conventional case of using metal catalysts such as Pt catalyst.

The following examples are provided for the purpose of further illustrating the present invention but are in no way to be taken as limiting.

EXAMPLE 1

Commercial sulfuric acid of first class grade was diluted with water and mixed with aqueous hydrogen peroxide of first class grade to prepare a sample of dilute sulfuric acid containing 75.0 wt % sulfuric acid and 2.15 wt % hydrogen peroxide. A portion (1013 g) of the dilute sulfuric acid was put into a 1-L glass beaker. After 100 g of coke pieces having an average piece size of 10 mm was added, the contents of the beaker were stirred as the temperature was held at 60°–70° C. on a hot plate. After 4 hour reaction, the concentration of sulfuric acid in the treated solution was 73.4 wt % whereas the concentration of hydrogen peroxide was no more than 1 ppm.

EXAMPLE 2

Sulfuric acid and aqueous hydrogen peroxide, each being of first class grade, were mixed in the proportions shown in Table 1 below to prepare various samples of dilute sulfuric acid. Coke (10 wt %) was added to each sample and the effect of temperature on the efficiency of hydrogen peroxide removal by treatment with coke was investigated.

TABLE 1

| Run No. | Sample solution | | | Condition of treatment | | $H_2O_2$ (%) in the treated solution |
|---|---|---|---|---|---|---|
| | $H_2O_2$ (%) | $H_2SO_4$ (%) | pH | temperature (°C.) | time (hour) | |
| 1 | 0.88 | 72.6 | — | 60–70 | 4 | ≦0.0001 |
| 2 | 0.88 | 72.6 | — | 20–30 | 4 | 0.46 |
| 3 | 1.00 | 1.1 | 0.94 | 20–30 | 4 | 0.82 |
| 4 | 1.00 | 1.1 | 0.94 | 30–40 | 4 | 0.65 |
| 5 | 1.00 | 1.1 | 0.94 | 50–60 | 4 | 0.45 |
| 6 | 1.00 | 1.1 | 0.94 | 60–70 | 4 | ≦0.0001 |
| 7 | 1.04 | 0.28 | 1.47 | 60–70 | 4 | 0.0005 |
| 8 | 1.04 | 0.28 | 1.47 | 20–30 | 4 | 0.66 |
| 9 | 1.04 | — | 2.31 | 60–70 | 4 | ≦0.0001 |
| 10 | 1.04 | — | 2.58 | 60–70 | 4 | 0.10 |
| 11 | 1.09 | — | 2.87 | 60–70 | 4 | 0.14 |
| 12 | 1.02 | — | 4.62 | 60–70 | 4 | 0.20 |

As one can see from Table 1, the ability of coke to reduce the concentration of hydrogen peroxide was apparent in all runs. However, in order to reduce the concentration of hydrogen peroxide to 0.1 wt % and below, the aqueous solution had to be rendered acidic in the pH range of 2.6 and below (pH≦2.6) and, at the same time, the temperature for the treatment had to be held at 60° C. and above. By proper selection of the temperature for the treatment and the pH of the solution, the concentration of hydrogen peroxide could be reduced to 0.0001 wt % and below.

EXAMPLE 3

Sample solutions of sulfuric acid having 60 wt % of sulfuric acid and 1.78 wt % of hydrogen peroxide were prepared. These solutions were used to investigate the relationship between the amount of coke addition and the effect of treatment with coke. With the temperature for the treatment fixed at 60° C., the amount of coke addition was varied at 1 wt %, 5 wt % and 10 wt %; the respective concentrations of the residual hydrogen peroxide after 4-hour treatment were 1.13 wt %, 0.67 wt % and no more than 0.0001 wt %.

These data show that while the concentration of residual hydrogen peroxide decreases as the coke addition increases, at least 10 wt % of coke has to be added if one wants to remove the hydrogen peroxide completely by contact for 4 hours.

EXAMPLE 4

Two columns (inner diameter=75 mm; height=500 mm) each packed with 1423 g of coke were connected in series. With the space velocity (S.V.) or the flow rate per unit capacity of the packed layer being controlled at 0.5, a 92.6 L amount of a sulfuric acid solution containing 56 wt % sulfuric acid and 2.10 wt % hydrogen peroxide was supplied overhead the columns and allowed to flow down after preheating to 60° C. During the reaction, the columns were held at 60° C. by means of a heater. The concentration of hydrogen peroxide in the treated solution was no more than 0.0001 wt %.

After the reaction, the coke in the first column was found to weigh 1238 g, indicating that 185 g of the coke was consumed in the reaction. Assuming that the reduction of hydrogen peroxide with carbon would proceed by the reaction scheme $C+2H_2O_2 \rightarrow CO_2+2H_2O$, it was found that about 40% of the hydrogen peroxide contained in 92.6 L of the sulfuric acid solution to be treated was reductively decomposed with the carbon in the coke whereas the remaining 60% was decomposed by contact with the coke.

EXAMPLE 5

Five columns each having a capacity of 0.2 m³ were connected in series; the first column was fitted with a heating coil and used as a preheating column whereas the second, third, fourth and fifth columns were each packed with 80 kg of coke and used as treating columns. A sample solution having 0.9 wt % hydrogen peroxide dissolved in 75 wt % sulfuric acid was supplied continuously into the first column and the solution preheated to 60° C. was passed through the second, third, fourth and fifth columns in sequence. After 5 m³ of the sample solution was treated for 50 hours, the average concentration of residual hydrogen peroxide in the treated solution was found to be no more than 1 ppm.

EXAMPLE 6

In this example, three different carbonaceous materials, coke, charcoal and activated carbon, were used and their efficacy was checked. To this end, aqueous solutions containing 1.02 wt % hydrogen peroxide and 0.99 wt % sulfuric acid were prepared and to these test solutions, the carbonaceous materials were added, each in an amount of 10 wt % of the solution. In each run, the solution was stirred for 4 hours to carry out the intended reaction. The results are shown in Table 2 below. The respective carbonaceous materials had the following average particle sizes: 10 mm for coke; ≦20 mm for charcoal; 34 μm for activated carbon.

TABLE 2

| | Concentration of $H_2O_2$ (wt %) | | | | |
|---|---|---|---|---|---|
| | 0 hr. | 1 hr. | 2 hrs. | 3 hrs. | 4 hrs. |
| Coke | 0.99 | 0.67 | 0.41 | 0.20 | 0.0001 |
| Charcoal | 0.99 | 0.82 | 0.67 | 0.53 | 0.42 |
| Activated carbon | 0.99 | 0.03 | ≦0.0001 | — | — |

EXAMPLE 7

In this example, the effect of temperature on the efficiency of treatment with activated carbon was checked. To this end, aqueous solutions containing 1.00 wt % sulfuric acid and 1.00 wt % hydrogen peroxide were prepared and to these sample solutions, activated carbon having an average particle size of 34 μm was added in an amount of 10 wt % of the solution; with the temperature varied at 40° C., 50° C. and 60° C., treatment with activated coal was performed for 4 hours. The concentration of residual hydrogen peroxide in the treated solutions was 1200 ppm (40° C.), 30 ppm (50° C.) and no more than 1 ppm (60° C.).

COMPARATIVE EXAMPLE 1

To examine the decomposition of hydrogen peroxide in dilute sulfuric acid due to ignition, a solution having 0.88 wt % hydrogen peroxide dissolved in 72.6 wt % sulfuric acid was treated at 180° C. (b.p.) for 30 min. After the treatment, the concentration of hydrogen peroxide in the solution was found to be no more then 0.0001 wt %.

However, this method was not suitable for implementation in practice since the container of the reaction solution did not have high enough resistance to corrosion and heat.

COMPARATIVE EXAMPLE 2

To examine the decomposition of hydrogen peroxide in sulfuric acid solution in a glass beaker in the absence of carbonaceous material, a 300-ml aliquot of a solution having 2 wt % hydrogen peroxide dissolved in 62 wt % sulfuric acid was taken into a 500-ml Griffin beaker and stirred at a controlled temperature of 60° C.

After 4-hour standing, the concentration of hydrogen peroxide in the solution was found to be 1.94 wt %.

COMPARATIVE EXAMPLE 3

It is generally held that hydrogen peroxide is labile and tends to decompose in the presence of impurities or coarse surfaces. Thus, in this comparative example, a glass powder and two other catalysts were used to check for the catalytic decomposition of hydrogen peroxide in dilute sulfuric acid. Stated more specifically, sample solutions were prepared by dissolving 1.99 wt % hydrogen peroxide in 60 wt % sulfuric acid and to those solutions, a glass powder, a silica powder and river sand were added in respective amounts of 15 wt %, 15 wt % and 10 wt %g. After 4-hour treatment, the respective concentrations of residual hydrogen peroxide in the solutions were 1.5 wt %, 1.46 wt % and 1.96 wt %.

As described on the foregoing pages, the method of the present invention is characterized in that a waste acid or wastewater that contains hydrogen peroxide is brought into contact with a porous carbonaceous material at a predetermined elevated temperature, with the pH condition being optionally adjusted to lie within a predetermined range. Unlike the conventional method of using a catalyst, the method of the invention has no need to take a special precaution for preventing the decrease in catalyst activity and yet it is capable of removing hydrogen peroxide in an efficient and economical manner. Using this method will provide a technology that enables not only the removal of hydrogen peroxide from ordinary plant effluents but also the recycling of hydrogen peroxide containing spent sulfuric acid or the like that has been used in the process of semiconductor fabrication.

What is claimed is:

1. A method of completely decomposing residual hydrogen peroxide contained in a waste acid, which comprises contacting waste acid having a pH not higher than 2.6 and which contains hydrogen peroxide, with coke at a temperature in the range from 60° C. to less than the boiling point of said waste acid, thereby reductively and catalytically decomposing the hydrogen peroxide in said waste acid.

2. The method according to claim 1 wherein said hydrogen peroxide containing waste acid is a waste acid which has been produced, in the process of semiconductor fabrication.

3. A method of decomposing hydrogen peroxide contained in a waste sulfuric acid, which comprises preheating a waste sulfuric acid containing hydrogen peroxide produced in the process of semiconductor fabrication, to a temperature in the range of 60° C. to less than the boiling point of said waste sulfuric acid, and passing the preheated sulfuric acid through a column or columns each packed with coke to thereby obtain purified sulfuric acid whose content of the remaining hydrogen peroxide is 1 ppm or below.

4. A method of decomposing residual hydrogen peroxide contained in a wastewater, which comprises adjusting the acidity of the wastewater which contains hydrogen peroxide to the pH range of 2.6 or below, and then contacting said wastewater with coke at an elevated temperature, thereby reductively and catalytically decomposing the hydrogen peroxide in said wastewater.

5. A method of decomposing residual hydrogen peroxide contained in a wastewater having pH in the acidic range not higher than 2.6, said wastewater containing hydrogen peroxide, which comprises contacting said wastewater hydrogen peroxide with coke at an elevated temperature in the range from 60° C. to less than the boiling point of said wastewater thereby reductively and catalytically decomposing the hydrogen peroxide in said wastewater.

* * * * *